United States Patent [19]

Schade

[11] 4,017,400
[45] Apr. 12, 1977

[54] OIL FILTER
[76] Inventor: Harvey R. Schade, P.O. Box 83, Edgerton, Wis. 53534
[22] Filed: May 19, 1975
[21] Appl. No.: 579,032

Related U.S. Application Data
[63] Continuation-in-part of Ser. No. 433,992, Jan. 17, 1974, abandoned.
[52] U.S. Cl. .............................. 210/439; 210/443; 210/494 R; 210/497.1
[51] Int. Cl.² ....................................... B01D 27/00
[58] Field of Search .......... 210/439, 443, 487, 494, 210/497.1, DIG. 17

[56] References Cited
UNITED STATES PATENTS
3,308,956 3/1967 Yee et al. ...................... 210/439 X
3,504,803 4/1970 Brayman ............................ 210/439

FOREIGN PATENTS OR APPLICATIONS
554,104 1/1957 Belgium ............................ 210/439

Primary Examiner—Charles N. Hart
Assistant Examiner—Richard W. Burks
Attorney, Agent, or Firm—Keith Schoff

[57] ABSTRACT

A filter is disclosed for removing contaminants from recirculating lubricant by causing the lubricant to flow interstitially between layers of wound fibrous tissue which are retained and sealed against channeling of lubricant flow past the filter medium by the interposition thereamong of an annular baffle, the seal being enhanced by imposition of hydraulic force component radially of the filter medium.

4 Claims, 5 Drawing Figures

OIL FILTER

BACKGROUND OF THE INVENTION

This application is a continuation-in-part of Ser. No. 433,992 filed Jan. 17, 1974 and now abandoned.

Filters for removing carbon residue, abrasive particles, acid condensate and other sludge and corrosive matter from engine lubricating oil are well known, packaged either as disposable canisters or as replaceable cartridges. Inflow and outflow connections are provided in a base member adjacent one end face of the filter medium with a tubular extension of one of the connections running into the proximity of the opposite end of the enclosure. Oil entering the canister will flow axially through the filter element in interstices between layers of filter tissue. Installation may be either of full-flow type or by-pass flow type with provision being made for a constricting orifice, at least, in the latter type to insure adequate lubricating oil pressure for the engine. Pressure drop across the engine and filter installation my be from 15 pounds per square inch (p.s.i.) to ninety p.s.i. or more, and filter element diameter may be from three to eight inches or greater, resulting in substantial compressive forces being exerted hydraulically which tend to compress and distort a filter element. Heretofore, it has been thought that for a wound tissue, axial flow filter, the combined load of hydraulic force and mechanical spring compression, as provided to retain a filter element in position, will cause a filter element to firmly seat and expand against confining surfaces thereby to effect a positive seal against by-pass leakage, however, applicant has discovered that annular compressive deformation will also occur causing flow channels to form circumferentially around a filter element enabling fluid flow in the channels so formed to py-pass a filter element.

SUMMARY OF THE INVENTION

In axial flow, wound fibrous tissue filter media, annular seals are provided at the face of the filter element, preferably with at least one such seal being disposed at the outflow face, to isolate the collection manifold from communication with unfiltered fluid. Outer and inner peripheral seals are provided which can either be discrete sealing rings which seat against the enclosure walls or be integral with the end face of the encosure means and project into the face of the filter medium penetrating between leaves or filter tissue in interlocking baffle arrangement causing the tissue leaves to be relatively uncrushed and uncompressed. Seals so provided enhance utility of the filter because resistance to flow radially through multiple layers of tissue is several times as great as resistance to flow interstitially between tissue leaves with the result that pressure differential for a given distance radially of a filter element would be substantially greater than for a similar distance axially of the filter element. The compressive radial forces exerted on a filter element hydraulically tend to compress the element most immediately adjacent the enclosure walls causing the cross-sectional area of the filter element to be reduced with the result that gaps and channels appear between the filter element and the enclosure walls. An interlocking annular seal provided in the manner of this invention is enhanced in efficiency by application of radial pressure and will resist failure under extreme pressure better than seals formed by axial compression of a filter element or by an annular sealing ring which causes the filter element to be squeezed and deformed radially. For petroleum base fluids leakage appears to occur more frequently around the outer periphery of a filter element than about the inner periphery, particularly as compared to aqueous solutions for which inner peripheral leakage more commonly appears, and therefore, use of the means of this invention is particularly expedient for providing the outer peripheral seal of an oil filter.

DRAWINGS

DESCRIPTION

Figure 1:
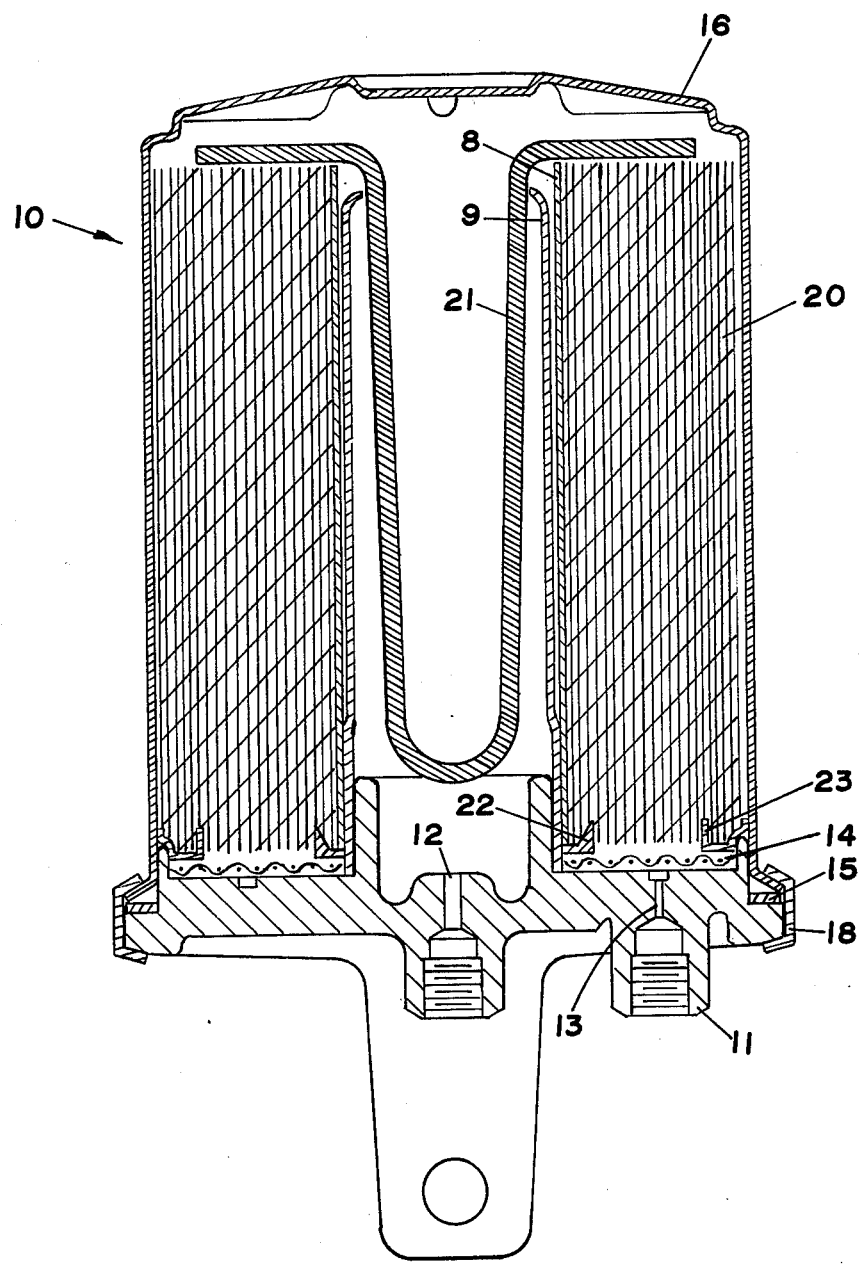
FIG. 1 is a cross-sectional elevation of an oil filter accessory for an internal combustion engine showing sealing and seating ring means of this invention.

In FIG. 1 replaceable cartridge filter 10 is shown comprising die cast base 11 configured with core tube 9 projecting centrally from assembly 10 into proximity with the opposite end wall of filter assembly 10. Cardboard spool 8 upon which filter tissue is wound fits snugly about the base of core tube 9. Base 11 comprises outlet port 13 and inlet port 12, the latter communicating with core tube 9. Screen 14 is disposed covering the inner surface of base 11, and a shoulder provided on the periphery of base 11 is fitted with resilient gasket 15. Cylindrical dish configured cover 16 seats on gasket 15 and is sealed thereon by collar clamp 18. Filter element 20 is shown comprising layered windings of fibrous sheet tissue with a wound diameter which fully occupies the inside diameter of cover 16. Finger bail 21 extends through core tube 9 facilitating the removal of filter element 20 from cover 16. Fluid flows under pressure from inflow port 12 through core tube 9 to the opposite end extremity of cover 16 from that of base 11 where the fluid occupies the headspace shown and is forced into interstices between tissue layers in filter elements 20. Flow of fluid axially through filter element 20 causes fluid to issue from the outflow face of the filter element into the space occupied by screen 14 disposed on base 11 from which the fluid drains through outlet port 13. The foregoing apparatus as described is conventional and comprises no part of this invention.

Annular seal members 22 and 23 are press-fitted into sealing adjacency onto core tube 9 and cover 16, respectively. The seal members are tough, oil resistant synthtetic resinous material such as polyamide, polypropylene, chlorinated polyisobutylene, or other suitable resinous, metallic, ceramic or other material including steel, brass, aluminum, glass, or carbon either in the form of fiber or continuous matrix. As shown seal member 23 is configured in annular cross-section with an upward facing flared outer peripheral wall, the inner periphery comprising a narrow flat face upon which filter element 20 seats with the outer periphery being press-fitted against the wall of cover 16 with hydraulic pressure, which is greater above the member than subjacent, tending to seat the filter element onto the seal member and to conform the seal member into the configuration of the confining surface of the wall of cover 16 to insure integrity of the seal formed. Seal members 22 and 23 disposed as shown subjacent the outflow face of the filter element provide the only seating surface for filter element 20 with the filter element being firmly seated thereon by the combined forces of hydraulic and mechanical urging to provide tight and leakproof seating seals. The filter element seating surfaces are somewhat radially narrowed from the peripheries of annular filter element 20, experience having shown that when the seals are fully leakproof, the annular radial dimension of filter element 20 is diminished, in probability by the effect of hydraulic pressure, and requires that the seals be located so that the effect of radial compression on the filter element does not displace the peripheries of the filter element sufficiently to interrupt the seals. The squeezing effect produced on the filter element and the extent of the dimensional change produced are unexpected and unforeseen phenomena which applicant has discovered and which have not heretofore been adequately recognized as reflected by the construction of prior art devices in which peripheral seals, if any, are disposed only at the most peripheral extremities of a filter element so as to be insufficient to maintain the integrity of the seal, which fails when the annular radius of the element diminishes in consequence of the application of hydraulic pressure. The provision of functionally efficient peripheral seals in the nammer herein described is critical for axial flow filters utilizing fibrous tissue layers arrayed in the manner hereinabove described.

Figure 2:
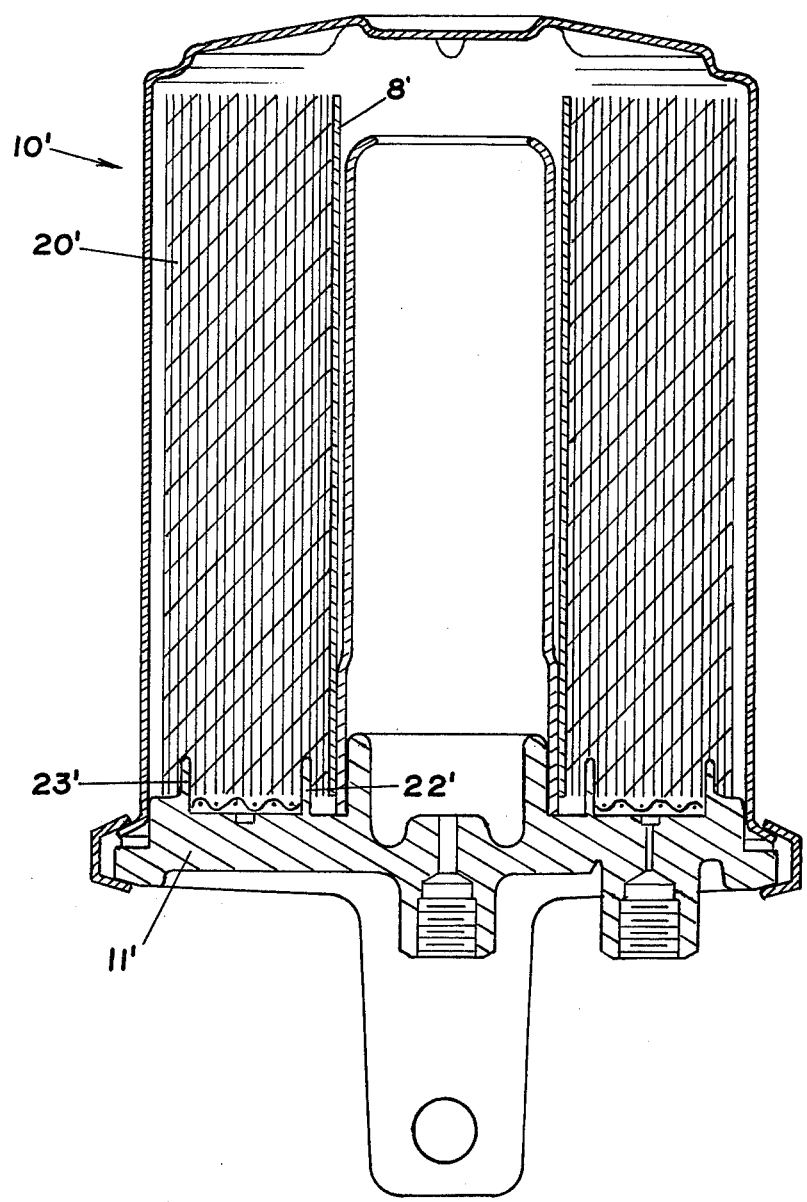
FIG. 2 is a cross sectional elevation of another embodiment of an oil filter accessory for an internal combustion engine showing annularly configured, integral sealing means of this invention.

In FIG. 2 is shown another embodiment of a replaceable cartridge filter assembly similar in material respects to that shown in FIG. 1, but having base 11' configured with upwardly projecting integral flange portions 22' and 23' interdisposed between individual leaves of tissue in filter medium 20'. The provision of integral sealing flange portions in base 11' eliminates two discrete elements from the filter assembly compared to the device of FIG. 1. Elimination of press-fitted sealing rings, such as rings 22 and 23 of FIG. 1, also enable greater dimensional clearance to be provided in the device of FIG. 2 than in the device of FIG. 1 with the advantage that substantially greater annular spacing between the filter medium and the enclosure can be provided, facilitating the ease with which cover 16' can be placed over filter medium 20' and secured, or with which the filter medium can be extracted from within the cover after removal for servicing. A finger bail may be provided in filter 10' in the manner shown in FIG. 1, but is not necessary for readily removing the cartridge from the cover.

Spool 8' as shown will typically be a cardboard cylinder upon which a tissue sheet is wound to provide the filter element. Cardboard is relatively stable against diminsional change in petroleum base fluid so that a seal made at the inflow end extremity thereof is effective for deterring excess fluid seepage between the spool and the tissue layers. At the outer periphery of the filter element, unconstrained by a corresponding cardboard or structural casing member, it is preferred to provide a seal at the base as illustrated in FIGS. 1 and 2 to gain use of the full length of the filter element and positive seating pressure exerted hydraulically against the outflow face, however, it is within the scope of this invention to provide both inner and outer peripheral seals at the inflow end extremity of the filter element, the critical condition for seal integrity as disclosed by this invention being that a lip or baffle configured as a thin annular projection extend into interlocking arrangement among leaves of tissue so as to be sandwiched therebetween radially removed from a peripheral extreme of a filter medium a sufficient distance so that distortion and compression imposed upon the filter medium in use at the peripheral faces does not extend to leaves of tissue with which the lip or baffle is interlocked, the configuration of the lip or baffle and the insertion thereof among tissue plies being such that disruption of the arrangement of tissue is minimal and without substantial or significant crushing effect. For this purpose the faces of the lip or baffle are preferably concentric and parallel to the lie of the tissue plies, with the outer face particularly being substantially radially perpendicular to maximize the sealing contact provided by hydraulic pressure being exerted peripherally about the filter medium, and the minimize the tendency of the filter medium to move against the head pressure at the inflow face and ride over the lip or baffle configuration.

Figure 3:
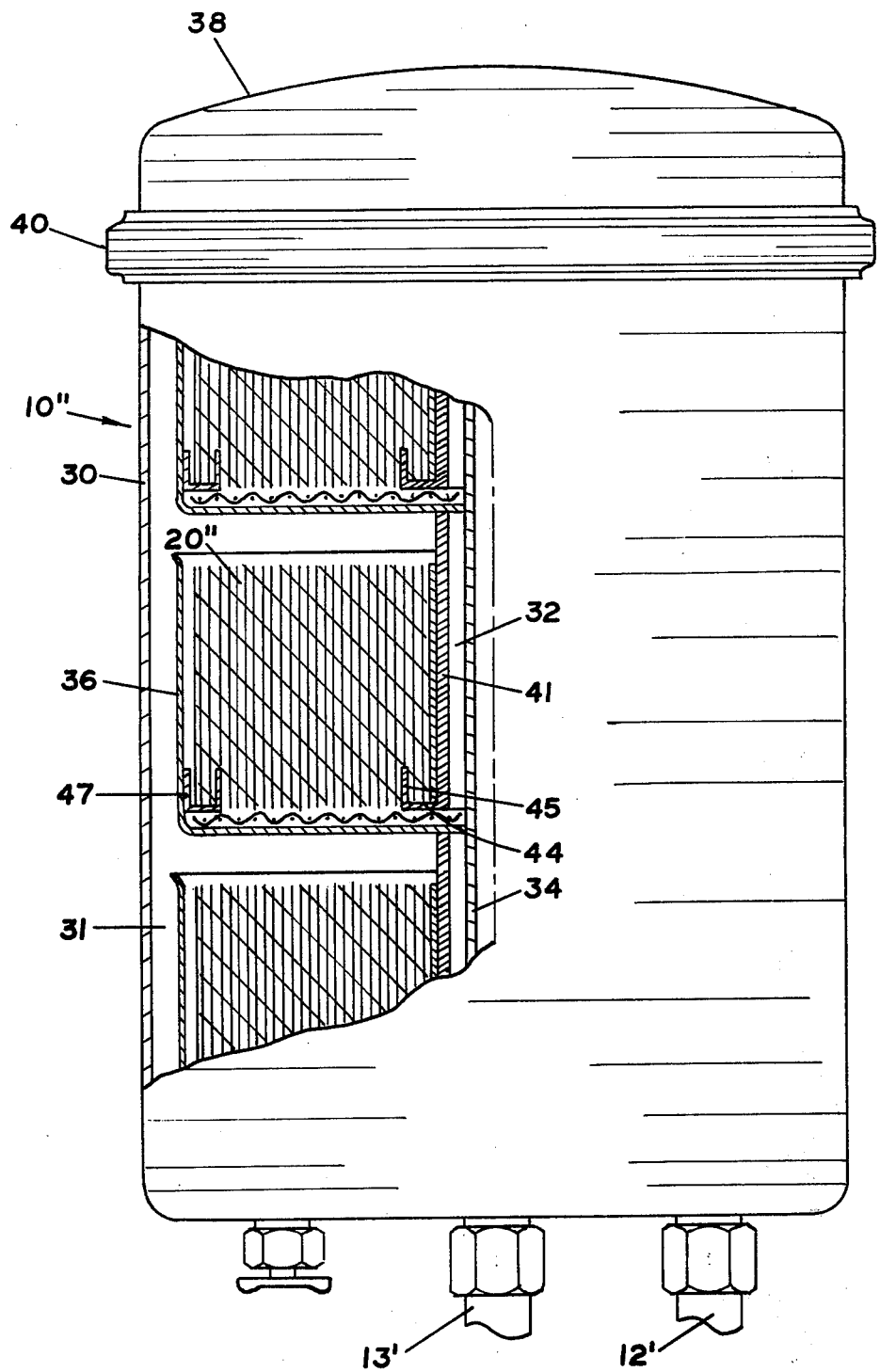
FIG. 3 is a cross-sectional elevation of a cut-away portion of another embodiment of an oil filter means comprising multiple filter elements provided with means of this invention.

In FIG. 3 is shown filter assembly 10" comprising enclosure 30 within which are disposed receptacles 36 for receiving wound rolls of fibrous sheet tissue 20". Manifold space 31 exists between receptacles 36 and enclosure 30 which communicates with inlet port 12'. Annulus 32 is shown formed by concentrically disposed tubular cores 41 of filter elements 20" amd structural tube 34, and serves as a collection manifold for filtered fluid to drain from filter assembly 10" through outlet portion 13'. Multiple filter elements 20" are provided axially spaced in receptacles 36 within enclosure 30 as needed to provide a desired filtering capcity. Receptacles 36 as shown are configured cylindrically, and are perforated at the inner base extremity to enable filtered fluid to enter into annulus 32 and be drained from filtere 10'. The upper ends of tubular cores 41 provide suport for receptacles 36 disposed next above so as to provide head space between the superjacent receptacles 36 and the filter elements 20" enabling fluid to enter the filter elements without being sealed by the superjacent receptacles 36 abutting directly upon the filter elements or receptacle 36. For convenience of removing spent filter elements 20" and repacking receptacles 36 with a fresh filter element during servicing, receptacles 36 are shown to be of ample diameter to facilitate easy removal and insertion of filter elements 20' even when the elements are soaked after use. Base portions 44 of tubular cores 41 are configured as annular troughs with a cylindrical, upwardly extending, thin, substantially uniform lip portion 45 being provided to form each said base portion 44. Lip portion 45 is shown disposed appreciably removed radially from the body of tubular core 41 so as to span a considerable number of tissue leaves of filter element 20" and to be interdisposed thereamong without substantially imposing radial stress thereon, providing only a baffle arrangement therewith against which the peripherally innermost leaves of tissue of filter element will by operably compressed by hydraulic forces imposed radially of filter elements 20' to effect a secure, leak-proof seal independent of shifting or seating of the filter element by force components directed axially of filter elements 20".

Member 47 are provided in similar manner in abutting contact with the outflow face of filter elements 20' with the outer periphery of members 47 being disposed in abutting contact with receptacles 36. The sealing contact with receptacles 36. The sealing contact between members 47 and receptacles 36 is rendered leak-proof by the wall thickness of receptacles being made thin so as to readily conform to the circumferential form of members 47, an expedient which is made possible by lack of a hydraulic presure differential existing across the wall of receptacle 36. In addition, members 47 may be fabricated from light gauge stock so as to readily conform in peripheral configuration to the confining surface of receptacles 36 to provide an inexpensive leak-proof seal assembly. While members 47 can be provided as integral with receptacles 36, it is preferable to render the members removable to provide ease in cleaning residue therefrom. A baffle type seal is provided with filter elements 20" by member 47 in the same manner as described for tubular cores 41. Cover 38 is provided on enclosure 30 and is sealed thereon by means of collar clamp 40.

Figure 4:
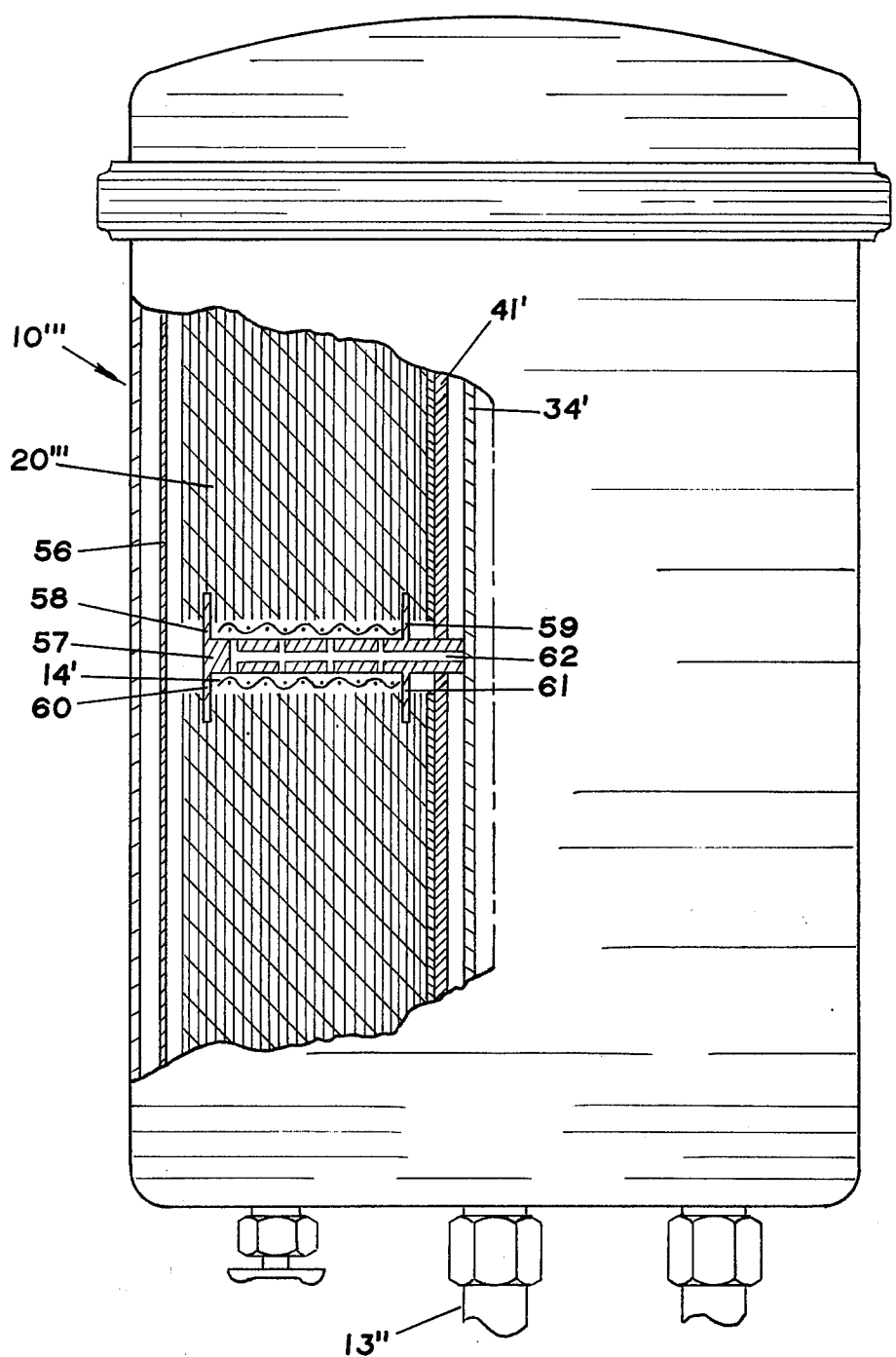
FIG. 4 is a cross-sectional elevation of a cut-away portion of another embodiment of a multiple element oil filter of this invention embodying provided with manifolds interdisposed between two elements for use in common.

In FIG. 4 is shown a preferred modification of the embodiment of the invention shown in FIG. 3 utilizing single receptacle 56 for multiple filter elements with ample clearance provided around the filter elements thereby insuring that pressure will be equalized acress the wall of receptacle 56 and enabling thin light gauge stock to be used for receptacles 56. The filter elements 20''' together with receptacle 56 may be economically disposed of in convenient manner. Annular member 57 separates two filter elements 20''' with projecting flange portions 58, 59, 60, 61 disposed in overlapping configuration with tissue leaves of filter elements 20'''. The baffle-like arrangement provides an efficient seal against leakage of fluid past both the inner and the outer peripheries of filter elements 20'''. Filtered fluid flows from the outflow faces of filter elements 20''' into channel 62 in separator member 57 and is delivered through the annulus formed between tubular core 41' and structural tube 34' to outflow port 13". The ends of tubular core members 41' abut separator member 57 and are maintained in tight contact therewith by means of a threaded fitting, not shown, disposed at the upper extremity of structural tube 34'. Screens 14' are provided to insure that headspace between member 57 and filter elements 20'''exists enabling filtered fluid to flow from the outlfow face of the filter elements. Filter 10'''of FIG. 4 provides sufficient dimensional tolerance to enable variation in size of filter elements 20''' and a variety of roll and core sizes can be used without deleterious effect.

Figure 5:
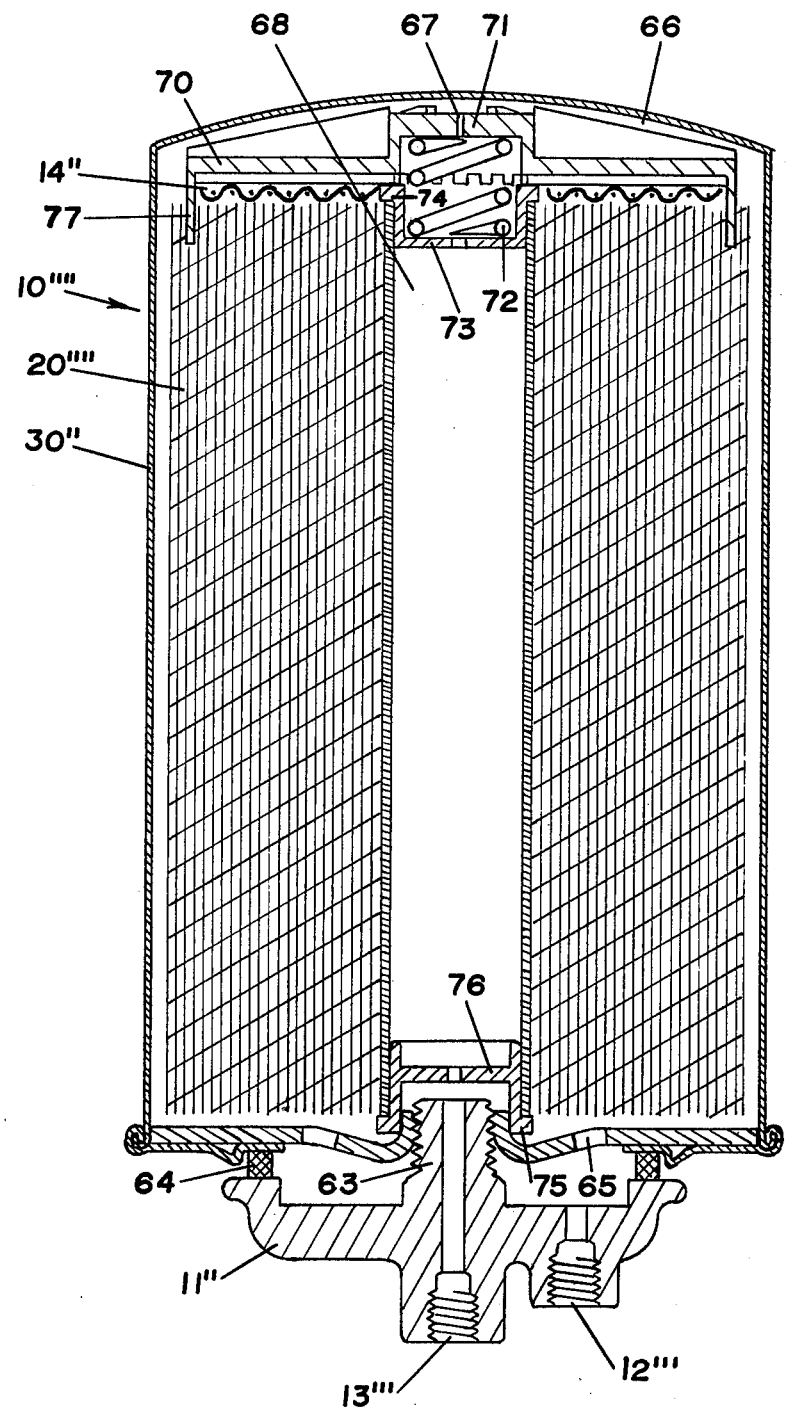
FIG. 5 is a cross-sectional elevation of a disposable spin-on oil filter embodiment of this invention.

In FIG. 5 filter 10'''' comprises a unitary filter element 20'''' and canister 30'' permanently sealed. The filter is received on base 11'' by means of threaded fitting 63 and incorporates elastomeric sealing ring 64 in the manner conventional for spin-on type disposable filters. Fluid to be filtered passes through inlet port 12''' and orifice 65 into a headspace immediately below filter element 20'''' and communicated with the annular space around the outer circumference of the filter element. A narrow headspace 66 is provided under the domed top of canister 30'' through which unfiltered fluid can flow and reach bleed orifice 67 and from there flow downward through core opening 68 and pass out outlfow port 13'''. The provision of means to bleed unfiltered fluid past the filtering medium is a desirable attribute for a filter which is used out of doors in cold climates. The viscosity of cold lubricants may be sufficiently great so that a filtering medium may be effectively clogged by viscous fluid and remain clogged until the filter is warmed sufficienty to render the lubricant more fluid. By enabling some fluid to by-pass the filtering medium by flowing around it within its enclosure, some lubricant will be caused to circulate through the machine, becoming warmed thereby, and to carry such warmth to the headspace at the inflow face and annulus surrounding filter element 20'''', thereby warming it and the fluid resident therein and causing the filter to function and pass lubricant much more quickly than would be the case if the filter were warmed entirely from without. The provision of a bleed passage for unfiltered fluid is similarly possible on other described embodiments of this invention.

Spacing element 70 is configured with an elevated central crown portion 71 providing a well for retaining spring 72. The lower extremity of spring 72 seats in cup 73 which is configured with lip 74 which abuts against core tube 8'' and extends onto the outflow face of filter element 20'''' thereby sealing the upper end of core opening 68 and providing downward directed spring tension loading on filter element 20''''. The lower end of core tube 8'', on which the tissue of element 20'''' is glued and wrapped, rests on shoulder 75 of inverted cup member 76 thereby providing a base support for filter element 20'''' and clearance adjacent the inflow face of the filter element. Depending flange-like portion 77 of spacing element 70 interlocks with leaves of tissue in a baffle arrangement in the manner described relative to FIG. 2. Screens 14'' is shown to insure that the outflow face of filter element 20'''' remains free and unobstructed for the flow of fluid, but the screen may be eliminated from filter 10'''', if desired.

The described embodiments of this invention provide a seal against fluid leakage which depends only on an interlocking baffle-like arrangement of tissue leaves and cylindrical flange rather than upon an axially directed force component to seat the filter element upon a base. The described seal is not only superior in effectiveness to seals depending on seating force, but eliminates distortion of a filtering element from seating pressure and reduces the structural requirements for components required to retain a filter element within a filter housing. In addition, the filters of this invention are more universal in accepting varying diameters, core size and lengths of filter elements than has heretofore been known, are superior in filtering a variety of liquids including both aqueous based solutions and organic solvents, and are particularly suited for use with fluids, such as lubricants, which become viscous during intermittent or interrupted use, the embodiment of FIG. 5 being unique among filters in providing head spaced beyond the base member which seats a filter, within the canister enclosure, wherein bleed by-pass flow passage for cold unfiltered fluid can occur to provide direct contact warming within the filter enclosure by unfiltered fluid and insure against inadequate feed or lubrication flow to machinery to which the filter is attached.

I claim:

1. In axial flow filtering apparatus for fluids which interstitially pass between leaves of an assemblage of tissue within a confining vessel, an improvement comprising means sealably partitioning said vessel isolating one transverse face of said assemblage of tissue from a second transverse face of said assemblage of tissue against communicating by-pass flow of fluid past said assemblage of tissue wherein said means is of a configuration comprising at least one relatively uniform, thin annular substantially cyclindrically uniform outer diameter lip projecting baffle-like interstitially in overlapped interposition with said leaves at said one face, interlocking with said leaves without substantial distortion of said assemblage of tissue to prevent fluid leakage past said assemblage of tissue.

2. The apparatus of claim 1 wherein said means partitioning said vessel is configured with one peripheral extremity in sealing contact with said vessel and another peripheral extremity in sealing contact with said one face of said assemblage of tissue.

3. The apparatus of claim 2 wherein said annular member is configured with an annular channel intermediate said peripheral extremities.

4. The apparatus of claim 2 wherein said apparatus is an oil filter for an internal combustion engine.

* * * * *